United States Patent [19]

Porter

[11] Patent Number: 5,361,561
[45] Date of Patent: Nov. 8, 1994

[54] APPARATUS FOR AND METHOD OF ROLLING A COVER OVER THE TOP OF A MODULE

[76] Inventor: Kenneth L. Porter, 4623 Hillsdale, Olive Branch, Miss. 38654

[21] Appl. No.: 984,905

[22] Filed: Dec. 2, 1992

[51] Int. Cl.[5] .................. B65B 11/02; B65B 27/12; B65B 41/16
[52] U.S. Cl. ............................ 53/397; 53/389.4; 53/580
[58] Field of Search ............. 206/83.5; 100/100, 210, 100/226; 53/588, 397, 580, 389.4, 157, 568, 459

[56] References Cited

U.S. PATENT DOCUMENTS

| | | | |
|---|---|---|---|
| 3,664,089 | 5/1972 | Keck | 53/157 X |
| 3,961,572 | 6/1976 | Johnston | 100/226 X |
| 4,127,061 | 11/1978 | Husky | 100/100 |
| 4,178,739 | 12/1979 | DuBroff | 53/588 |
| 4,483,127 | 11/1984 | Forkner | 53/580 |
| 4,995,216 | 2/1991 | Vansteelant | 53/389.4 X |

Primary Examiner—Linda B. Johnson
Attorney, Agent, or Firm—Walker, McKenzie & Walker

[57] ABSTRACT

An apparatus and method for use with a cotton module builder to roll a cotton module cover over the top of a cotton module while the cotton module is within the cotton module builder or as the cotton module builder is being moved from the cotton module. The apparatus includes a roll of flexible material; and a frame for being attached to the module builder, for supporting the roll of flexible material, and for allowing flexible material to be paid out from the roll of flexible material over a module as the frame is moved relative to the top of the module.

11 Claims, 2 Drawing Sheets 5,361,561

APPARATUS FOR AND METHOD OF ROLLING A COVER OVER THE TOP OF A MODULE

BACKGROUND OF THE INVENTION

1. Field of the Invention

The present invention relates, in general, to module covers and more specifically to an apparatus for and a method of rolling a cotton module cover over the top of a cotton module.

2. Description of the Related Art

When cotton is picked using typical mechanical cotton harvesters or the like, the cotton is normally either transferred directly to a trailer or wagon at the cotton field for transport to a cotton gin for subsequent processing or transferred into the open body of a cotton module builder for being compressed into a firm, self-supporting box-like stack or module having dimensions of approximately 36 feet (11 meters) long, 10 feet (3 meters) high, and 8 feet (2.4 meters) wide.

A conventional cotton module builder includes a generally rectangular, opened top, opened bottom bin having side walls and end walls with the rear end wall hinged for movement between an opened position and a closed position; a bridge member extending transversely across the opened top of the bin and movably attached to the top of the side walls of the bin; and a hydraulic compacting mechanism or tamper attached to the bridge member for movement back and forth along the length of the bin to tamp or compact cotton which has been dumped into the opened top of the bin. Adjustable wheel means are commonly provided on each side of the bin for movement between a first position in which the bin is supported above the ground for allowing the module builder to be pulled by a tractor or the like from one location to another, and a second position in which the bin is positioned on the ground to allow a cotton module to be built within the bin directly on the ground.

Such cotton modules may be left in the field for substantial periods of time before being transported to a cotton gin for further processing. It is common to attach a cover over the top of such cotton modules while the cotton modules remain in the field to provide some protection against rain and wind, etc. The typical cotton module cover consists of a cap-like member having a substantially rectangular top, side walls extending downward from each side of the top, and end walls extending downward from each end of the top. Such cotton module covers are typically manually applied over the top of cotton modules after the cotton module builders have been moved away from the cotton modules.

SUMMARY OF THE INVENTION

The present invention is directed toward providing an improved means for and method of covering the top of a cotton module or the like. The concept of the present invention is to apply a film-like cover over the top of a module while the module is in the module builder or as the module builder is being removed from the module.

The apparatus for rolling a module cover over the top of a module of the present invention includes, in general, a frame for being attached to the module builder, and a roll of cover material for being attached to the frame in such a manner that the cover material can be pulled over the top of a module within the module builder or as the module builder is being removed from the module.

An object of the present invention is to provide an apparatus for rolling a cotton module cover over the top of a cotton module while the cotton module is within a module builder or as the module builder is being removed from the cotton module.

Another object of the present invention is to provide such an apparatus that can be attached to existing cotton module builders.

DESCRIPTION OF THE PREFERRED EMBODIMENT

Figure 1:
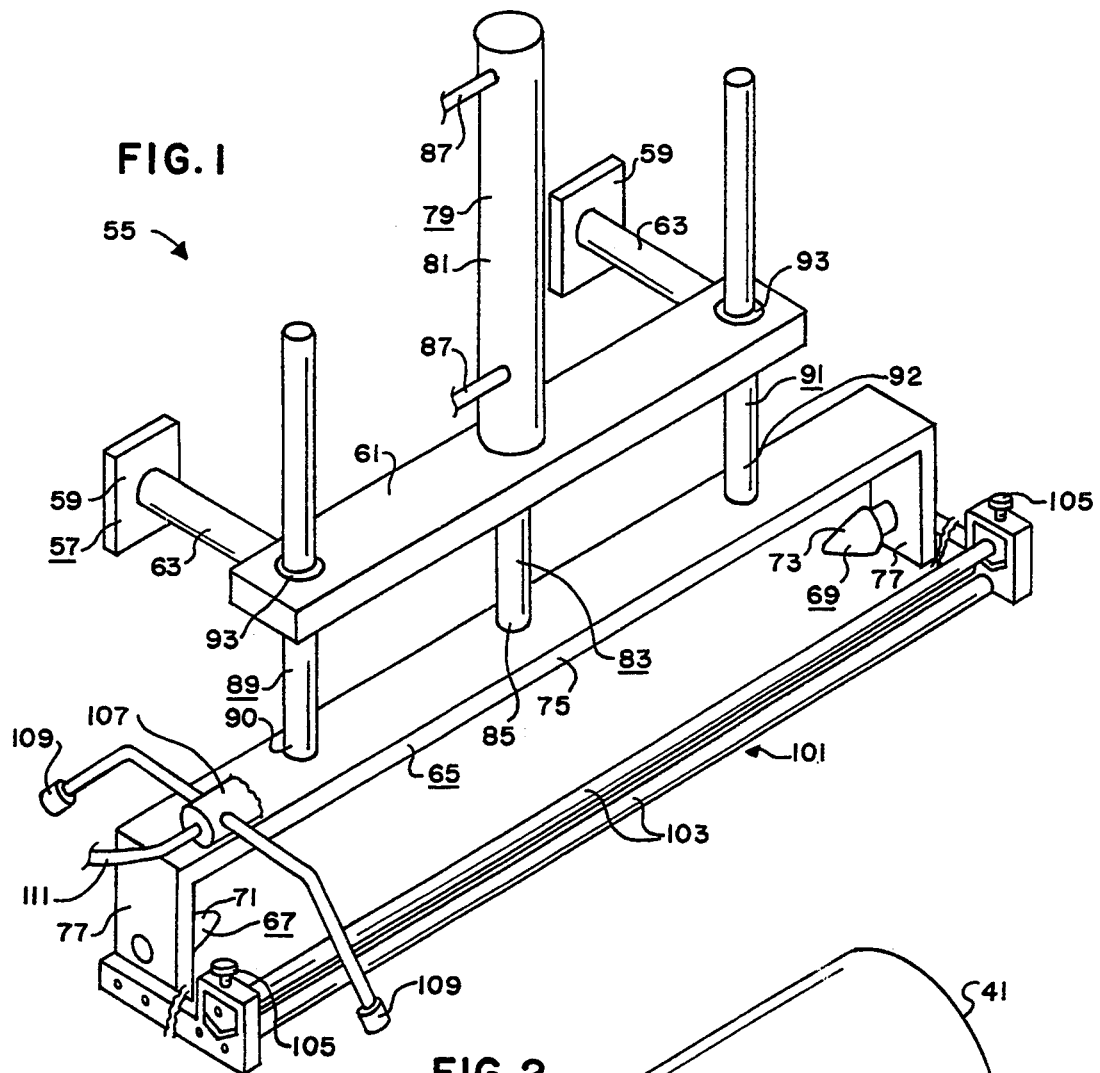
FIG. 1 is a perspective view of a frame portion of the apparatus for rolling a cotton module cover over the top of a module of the present invention.
Figure 2:
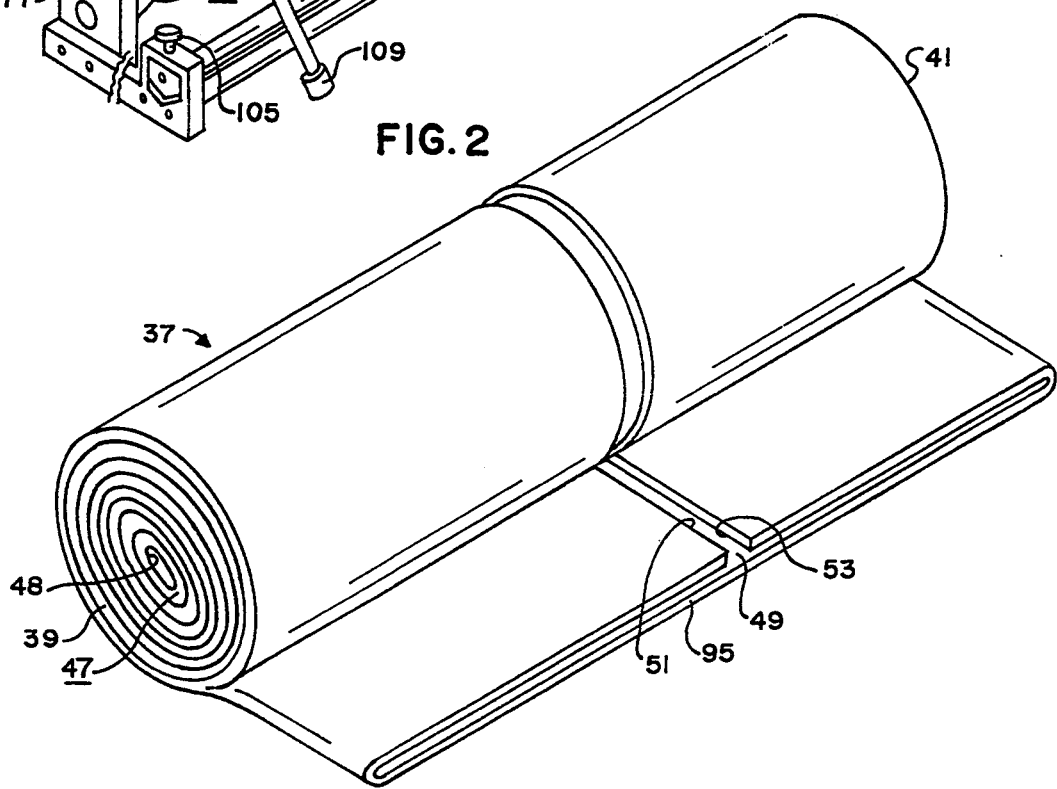
FIG. 2 is a perspective view of a roll portion of the apparatus for rolling a cotton module cover over the top of a module of the present invention.

The preferred embodiment of the apparatus of the present invention is shown in FIGS. 1-4 and identified by the numeral 11. The apparatus 11 is designed for use with a typical cotton module builder 13 to roll a module cover 15 over the top 17 of a cotton module 19 while the cotton module 19 is in the module builder 13 or as the module builder 13 is removed from the cotton module 19.

Figure 3:
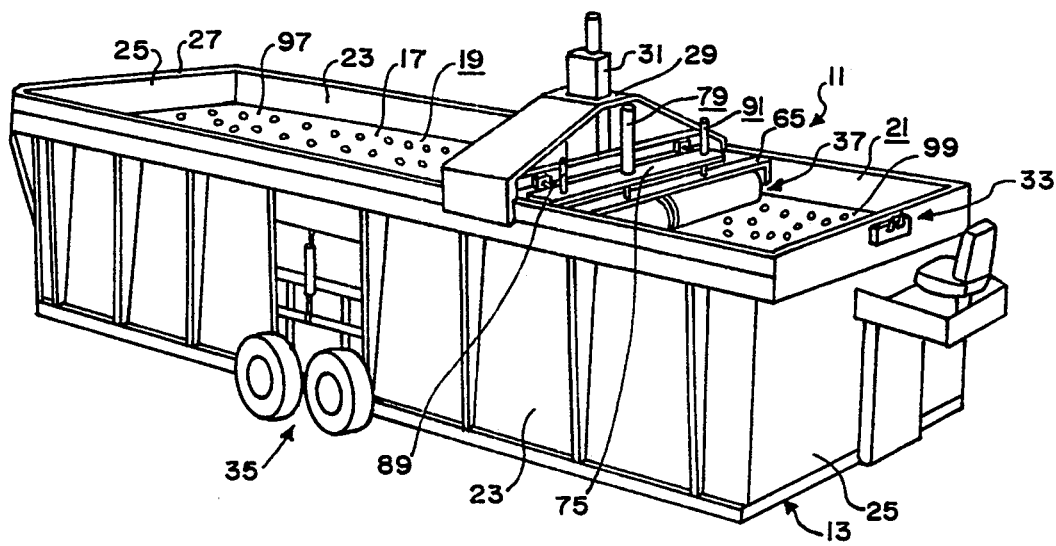
FIG. 3 is a perspective view of the apparatus for rolling a cotton module cover over the top of a module of the present invention shown in combination with a cotton module builder.
Figure 4:
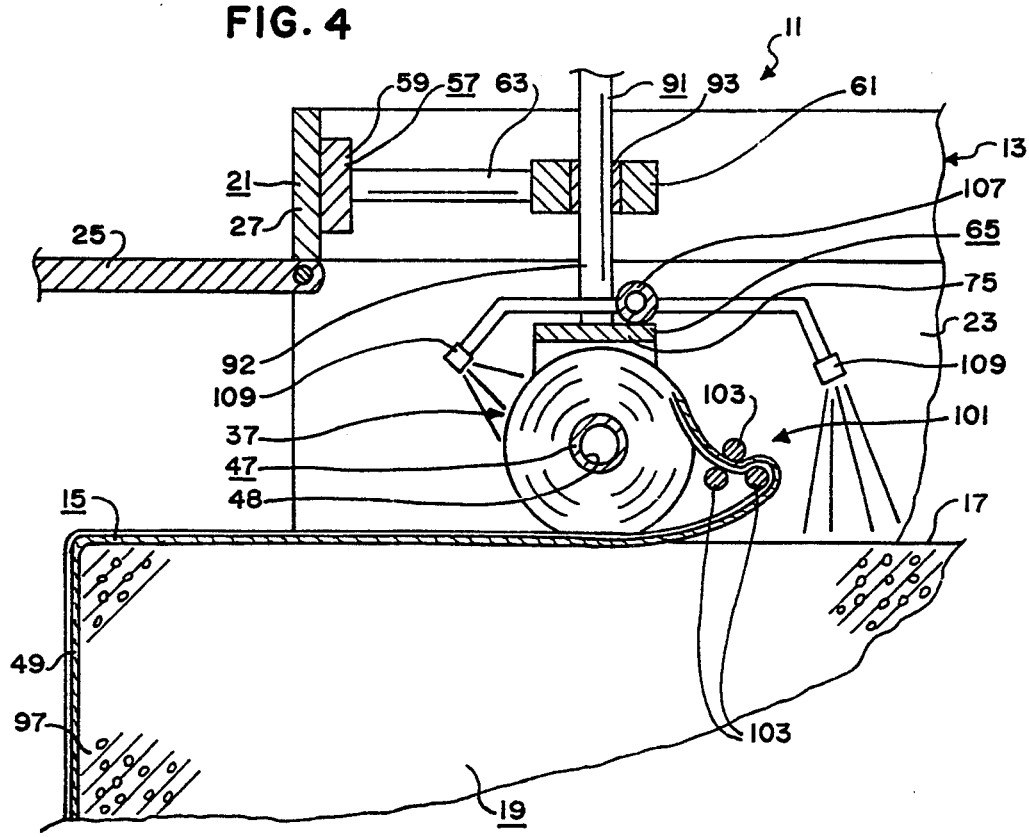
FIG. 4 is a sectional view of the apparatus for rolling a cotton module cover over the top of a module of the present invention shown in combination with a cotton module builder and a cotton module.

The cotton module builder 13 is of any typical construction well known to those skilled in the art. Thus, the cotton module builder 13 preferably includes a generally rectangular, opened top, opened bottom canister or bin 21 having side walls 23 and end walls 25 with one end wall i.e., the rear end wall 25 hinged for movement between an opened position as shown in FIG. 4 and a closed position as shown in FIG. 3. The module builder 13 typically includes a rigid, opened rectangular frame 27 attached to the top of the side walls 23 and the end walls 25. The rear end wall 25 may be hinged along the top edge to the frame 27 to allow the rear end wall 25 to open as shown in FIG. 4 for allowing the module builder 13 to be pulled away from a finished module 19. On the other hand, the rear end wall 25 may be hinged along a side edge thereof to one of the side walls 23, etc. The cotton module builder 13 preferably includes a bridge member 29 extending transversely across the opened top of the bin 21 and movably attached relative to the top of the side walls 23 of the bin 21. More specifically, opposite ends of the bridge member 29 are preferably rollably supported on the frame 27 directly above the top of the side walls 23 of the bin 21. A hydraulic compacting mechanism or tamper 31 is preferably attached to the bridge member 29 for movement back and forth along the length of the bin 21 with the bridge member 29 to tamp or compact cotton which has been dumped into the opened top of the bin 21. The cotton module builder 13 preferably includes drive means including hand controls 33 for allowing an operator to cause the bridge member 29 to move back and forth along the length of the bin 21 and to activate the tamping means 31. Adjustable wheel means 35 are commonly provided on each side wall 23 of the bin 21 for movement between a lowered position in which the bin 21 is supported above the ground for allowing the module builder 13 to be pulled by a tractor or the like from one location to another, and a raised position in which the bin 21 is positioned on the ground to allow a cotton module 19 to be built within the bin 21 resting directly on the ground. The construction, operation and use of such a cotton module builder 13 is well known to those skilled in the art.

The apparatus 11 includes a roll 37 of flexible material. The flexible material may be an elongated length of solid plastic sheeting such as standard polypropylene film, or netting, etc. The roll 37 of flexible material preferably has a first end or side 39 and a second end or side 41. The first end 39 of the roll 37 of flexible material preferably has a concavity therein. Likewise, the second end 41 of the roll 37 of flexible material preferably has a concavity therein. More specifically, the roll 37 of flexible material may be wound about a substantially rigid, hollow tube 47 with the opposite ends of the bore 48 through the tube 47 defining the concavities in the first and second ends 39, 41. The roll 37 of flexible material preferably includes an elongated length of flexible material having a face side 49, a first side edge 51 and a second side edge 53. The first and second side edges 51, 53 of the elongated length of flexible material are preferably folded over the face side 49 thereof so that the length of flexible material of the roll 37 thereof has approximately the same width as the module 19 when the first and second side edges 51, 53 thereof are folded over the face side 49 thereof and so that the first and second side edges 51, 53 thereof can be folded over the sides of the module 19 after the flexible material is paid or let out from the roll 17 of flexible material over the module 19 as shown diagrammatically in FIG. 4.

The apparatus 11 includes frame means 55 for being attached to a module builder 13, for supporting the roll 37 of flexible material, and for allowing flexible material to be paid or let out (i.e., unrolled) from the roll 37 of flexible material over a module 19 as the frame means 55 is moved relative to the top of the module 19.

The frame means 55 preferably includes base means 57 for being fixedly attached to the module builder 13. The base means 57 preferably includes a spaced apart pair of plate members 59 for being bolted or otherwise fixedly attached to the module builder 13. For example, the plate members 59 may be bolted directly to the bridge member 29 of the module builder 13 as shown in FIG. 3 whereby the frame means 55 will move back and forth along the length of the bin 21 with the bridge member 29 and tamper 31. On the other hand, the plate members 59 may be bolted or otherwise fixedly attached to the frame 27 of the module builder 13 directly above the opening end wall 25 of the bin 21 of the module builder 13 as shown in FIG. 4 whereby the frame means 55 will move relative to the top of the module 19 as the module builder 13 is pulled away from a finished module 19 in the typical manner. The base means 57 preferably includes an elongated bar member 61 for extending transversely across the opened top of the bin 21 of the module builder 13, and a pair of arm members 63 for fixedly Joining the bar member 61 to the plate members 59. The base means 57 may be manufactured in various manners out of various materials as will now be apparent to those skilled in the art. For example, the various parts of the base means 57 may be machined or otherwise formed out of metal and welded or otherwise fixedly attached to one another to create a rigid, one-piece unit.

The frame means 55 preferably includes a roll support means 65 for being attached to the base means 57 and for supporting the roll 37 of flexible material. The roll support means 65 preferably includes a first support engagement means 67 for supportingly engaging the first end 39 of the roll 37 of flexible material, and a second support engagement means 69 for supportingly engaging the second end 41 of the roll 37 of flexible material. The first support engagement means 67 preferably includes a head member 71 for extending into the concavity in the first end 39 of the roll 37 of flexible material. The second support engagement means 69 preferably includes a head member 73 for extending into the concavity in the second end 41 of the roll 37 of flexible material. The head members 71, 73 are preferably rotatable for allowing the roll 37 of flexible material to easily rotate about its longitudinal axis. The roll support means 65 preferably includes an elongated bar member 75 for extending transversely across the opened top of the bin 21 of the module builder 13, and a leg member 77 extending downward from each end of the bar member 75. The support engagement means 67, 69 are attached to respective ones of the leg members 77. More specifically, the head members 71, 73 of the support engagement means 67, 69 may be rotatably attached to the leg members 77. The roll 37 of flexible material can thus be snapped between the opposite head members 71, 73 to thereby rotatably secure the roll 37 of flexible material to the roll support means 65. The roll support means 65 may be manufactured in various manners out of various materials as will now be apparent to those skilled in the art. For example, the bar member 75 and leg members 77 may be machined or otherwise formed out of metal and welded or otherwise fixedly attached to one another to create a rigid, one-piece unit, and the support engagement means 67, 69 may be machined or otherwise formed out of metal and rotatably mounted to respective leg members 77 by way of standard bearings, bushings or the like (not shown) as will now be apparent to those skilled in the art.

The roll support means 65 is preferably movably attached to the base means 57 for allowing the height of the support engagement means 67, 69 and, thus, the roll 37 of flexible material to be varied. The frame means 55 preferably includes means 79 extending between the roll support means 65 and the base means 57 for securing the roll support means 65 to the base means 57 and for allowing the roll support means 65 to be moved between raised and lowered positions relative to the base means 57 for urging the roll of flexible material against the top of the cotton module. The means 79 may consist of a standard hydraulic piston for being coupled to the hydraulic system of the cotton module builder 13 for allowing the operator of the cotton module builder 13 to also operate the piston means 79. Thus, the means 79 preferably includes a hydraulic piston cylinder 81 for being fixedly attached to the bar member 61 of the base means 57, and a piston rod 83 having a first or proximal end for being movably mounted within the piston cylinder 81 and having a second or distal end 85 for being fixedly attached to the bar member 75 of the roll support means 65. Typical hydraulic hoses 87 extend between the piston cylinder 81 to the hydraulic system of the cotton module builder 13, etc., as will now be apparent to those skilled in the art. On the other hand, it should be noted that the means 79 may include a typical electric motor and drive train, etc., as will now be apparent to those skilled in the art.

The frame means 55 preferably includes stabilizing means for stabilizing the movement of the roll support means 65 and the roll 37 of flexible material between the raised and lowered positions. The stabilizing means preferably includes a first stabilizing bar or rod 89 slidably attached to the bar member 61 of the base means 57 with one end 90 thereof fixedly attached to the bar member 75 of the roll support means 65, and preferably includes a second stabilizing bar or rod 91 slidably attached to the bar member 61 of the base means 57 with one end 92 thereof fixedly attached to the bar member 75 of the roll support means 65. Bushings 93 or the like may be provided on the bar member 61 of the base means 57 for slidably receiving the stabilizing rods 89, 91. The first and second stabilizing rods 89, 91 are preferably spaced apart from one another as clearly shown in FIGS. 1 and 3.

The apparatus 11 may include tension means 101 for applying tension to the flexible material as it is pulled off the roll 37 thereof over the top of the cotton module 19 so that the flexible material will be substantially taut over the top of the cotton module 19, etc. The tension means 101 may include a plurality of elongated rollers 103 for being attached to the roll support means 65 substantially as shown in FIGS. 1 and 4 whereby the outer end 95 of the flexible material can be threaded through the rollers 103 (see FIG. 4) so that tension will be placed on the material as it is rolled over the top of the cotton module 19. Adjustment means is preferably included for allowing the amount of tension applied to the material by the tension means 101 to be controlled. The adjustment means may consist simply of screw means 105 or the like for allowing one of the rollers 103 to be moved toward and away from the other rollers 103 as will now be apparent to those skilled in the art.

Spray means may be attached to the frame means 55 and/or portions of the module builder 13 for spraying a fluid onto the top and upper side edges of the cotton module 19 and/or the flexible material of the roll 37 of flexible material to help secure the flexible material to the cotton module 19 and to help make the module cover 15 water-resistant or water-proof, etc. The spray means may include a manifold 107 for being attached to the bar meter 75 of the roll support means 65 and a plurality of nozzles 109 attached to the manifold 107 and positioned so as to spray fluid onto the roll 37 of flexible material and onto the top of the cotton module 19 as clearly shown in FIG. 4 as or just prior to the flexible material being rolled onto the top of the cotton module 19. The liquid may be any typical wax or paraffin based product, starch based product, sugar based product, or synthetic based product, etc. The spray means may include conduit means 111 extending from a pressurized source of fluid (not shown) to the manifold 107. The pressurized source of fluid may consist simply of a pressurized tank or other fluid reservoir. Conventional valves or the like (not shown) are preferably provided for allowing the operator of the apparatus 11 to selectively activate the spray means as will now be apparent to those skilled in the art.

The method of using the apparatus 11 to roll a cotton module cover 15 over the top of a cotton module 19 while the cotton module 19 is located with a cotton module builder 13 of the present invention is quite simple. After the cotton module 19 has been built within the bin 21 of the cotton module builder 13, the outer end 95 of the length of flexible material of the roll 37 is manually secured to the first end 97 of the cotton module 19 using any typical method or means now apparent to those skilled in the art such as pins, ties or the like (not shown). Next, if the frame means 55 is secured to the bridge member 29 of the module builder 13 as shown in FIG. 3, the operator of the module builder 13 merely causes the bridge member 29 to move from the first end 97 of the cotton module 19 to the second end 99 of the cotton module 19, causing the flexible material to be paid out from the roll 37 of flexible material over the top of the cotton module 19 from the first end 97 of the cotton module 19 to the second end 99 of the cotton module 19. On the other hand, if the frame means 55 is secured to the frame 27 of the module builder 13 adjacent the opening end wall 25 as shown in FIG. 4, the module builder 13 is merely pulled away from the cotton module 19 in the typical manner, again causing the flexible material to be paid out from the roll 37 of flexible material over the top of the cotton module 19 from the first end 97 of the cotton module 19 to the second end 99 of the cotton module 19. In either case, the flexible material of the roll 37 can then be cut, etc., adjacent the second end 99 of the cotton module 19 and secured to the second end 99 of the cotton module 19 using any typical method or means now apparent to those skilled in the art such as pins, ties or the like (not shown). If desired, the flexible material can be fed through the tension means 101 so that tension can be applied to the material as it is paid out over the top of the cotton module 19 to insure that the module cover 15 is substantially taut when applied. Also, the spray means can be used to spray the top and/or sides of the cotton module 19 with fluid and/or to spray the face side of the flexible material (i.e., the side of the flexible material that will be applied against the cotton module 19 if desired to help secure the flexible material to the cotton module 19 and to help make the module cover 15 water-resistant or water-proof, etc. It should be noted that transverse score lines, etc., can be made across the flexible material at spaced apart distances corresponding to the average length of a cotton module cover so that the flexible material can be easily torn apart, rather than cut, etc. However, if the tension means 101 is used, one of the rollers 103 can be used as a guide for cutting the flexible material. The side edges 51, 53 of the flexible material of the roll 37 can be turned down over the upper portion of the sides of the cotton module 19 and secured thereto using pins, ties or the like (not shown). Guide means (not shown) may be attached to the module builder 13 adjacent the rear end wall 25 for automatically turning the side edges 51, 53 of the flexible material down over the cotton module 19 as the module builder 13 is pulled away from the module 19.

Although the present invention has been described and illustrated with respect to a preferred embodiment and a preferred use therefor, it is not to be so limited since modifications and changes can be made therein which are within the full intended scope of the invention.

I claim:

1. The combination with a cotton module builder of the type having an opened top bin and a bridge member extending transversely across the opened top of said bin for movement back and forth along the length of said bin, of an apparatus for rolling a cotton module cover over the top of a cotton module while the cotton module is located within said bin; said apparatus comprising:

a) a roll of flexible material; and b) frame means attached to said bridge member of said cotton module builder for movement back and fourth along the length of said bin with said bridge member, for supporting said roll of flexible material, and for allowing flexible material to be paid out from said roll of flexible material over the top of a cotton module when that cotton module is located within said bin as said bridge member is moved back and forth along the length of said bin; said frame means including base means for being fixedly attached to said module builder and including roll support means for being attached to said base means and for supporting said roll of flexible material; said frame means including urging means for urging said roll of flexible material against the top of the cotton module.

2. The combination of claim 1 in which said roll support means of said frame means is movably attached to said base means of said frame means; in which said urging means of said frame means includes means extending between said roll support means and said base means for moving said roll support means between raised and lowered positions relative to said base means; and in which said frame means includes stabilizing means for stabilizing the movement of said roll support means between said first and second positions.

3. The combination of claim 1 in which said roll of flexible material has a first end and a second end; in which said roll support means includes a first support engagement means for supportingly engaging said first end of said roll of flexible material and includes a second support engagement means for supportingly engaging said second end of said roll of flexible material; in which said first end of said roll of flexible material has a concavity therein; in which said first support engagement means of said roll support means includes a head member for extending into said concavity in said first end of said roll of flexible material; in which said second end of said roll of flexible material has a concavity therein; and in which said second support engagement means of said roll support means includes a head member for extending into said concavity in said second end of said roll of flexible material.

4. The combination of claim 1 in which said roll of flexible material includes an elongated length of flexible material having a face side, a first side edge and a second side edge; said first and second side edges of said elongated length of flexible material being folded over said face side of said elongated length of flexible material so that said elongated length of flexible material has approximately the same width as said module when said first and second side edges thereof are folded over said face side thereof and so that said first and second side edges of said elongated length of flexible material can be folded over the sides of said module after said flexible material is paid out from said roll of flexible material over said module.

5. The combination with a cotton module builder of the type including a bin with a door at one end for allowing said bin to be pulled away from a cotton module after said cotton module is built within said bin, of an apparatus for rolling a cotton module cover over the top of a cotton module as said bin is pulled away from the cotton module; said apparatus comprising:

a) a roll of flexible material; and b) frame means attached to said bin of said cotton module builder for supporting said roll of flexible material and for allowing flexible material to be paid out from said roll of flexible material over the top of a cotton module as said bin is pulled away from that cotton module; said frame means including base means for being fixedly attached to said module builder and including roll support means for being attached to said base means and for supporting said roll of flexible material; said frame means including urging means for urging said roll of flexible material against the top of the cotton module.

6. The combination of claim 5 in which said roll support means of said frame means is movably attached to said base means of said frame means; in which said urging means of said frame means includes means extending between said roll support means and said base means for moving said roll support means between raised and lowered positions relative to said base means; and in which said frame means includes stabilizing means for stabilizing the movement of said roll support means between said first and second positions; said stabilizing means of said frame means including a first stabilizing bar fixedly attached to said roll support means and slidably attached to said base means, and including a second stabilizing bar fixedly attached to said roll support means and slidably attached to said base means.

7. The combination of claim 6 in which said roll of flexible material has a first end and a second end; in which said roll support means includes a first support engagement means for supportingly engaging said first end of said roll of flexible material and includes a second support engagement means for supportingly engaging said second end of said roll of flexible material; in which said first end of said roll of flexible material has a concavity therein; in which said first support engagement means of said roll support means includes a head member for extending into said concavity in said first end of said roll of flexible material; in which said second end of said roll of flexible material has a concavity therein; and in which said second support engagement means of said roll support means includes a head member for extending into said concavity in said second end of said roll of flexible material.

8. The combination of claim 7 in which said roll of flexible material includes an elongated length of flexible material having a face side, a first side edge and a second side edge; said first and second side edges of said elongated length of flexible material being folded over said face side of said elongated length of flexible material so that said elongated length of flexible material has approximately the same width as said module when said first and second side edges thereof are folded over said face side thereof and so that said first and second side edges of said elongated length of flexible material can be folded over the sides of said module after said flexible material is paid out from said roll of flexible material over said module.

9. A method of rolling a module cover over the top of a module while the module is located within a module builder; said module having a first end and a second end; said method comprising the steps of:

a) mounting a roll of flexible material to said module builder;

b) attaching the end of said flexible material to said first end of said module while said module is located within said module builder;
c) urging said roll of flexible material against the top of said module: and
d) moving said roll of flexible material from said first end of said module to said second end of said module, causing said flexible material to be paid out from said roll of flexible material over the top of said module from said first end of said module to said second end of said module.

10. A method of rolling a cotton module cover over the top of a cotton module while the cotton module is located within a cotton module builder; said cotton module having a first end and a second end; said cotton module builder having an opened top bin and a bridge member extending transversely across the opened top of said bin for movement back and forth along the length of said bin; said method comprising the steps of:
a) mounting a roll of flexible material to said bridge member of said cotton module builder;
b) attaching the end of said flexible material to said first end of said cotton module while said cotton module is located within said module builder;
c) urging said roll of flexible material against the top of said cotton module; and then
d) moving said bridge member and said roll of flexible material from said first end of said cotton module to said second end of said cotton module, causing said flexible material to be paid out from said roll of flexible material over the top of said cotton module from said first end of said cotton module to said second end of said cotton module.

11. A method of rolling a cotton module cover over the top of a cotton module while the cotton module is located within a cotton module builder; said cotton module having a first end and a second end; said cotton module builder having an opened top bin with a door at one end for allowing said bin to be pulled away from said cotton module after said cotton module is built within said bin; said method comprising the steps of:
a) mounting a roll of flexible material to said bin of said cotton module builder adjacent said door;
b) attaching the end of said flexible material to said first end of said cotton module while said cotton module is located within said module builder;
c) urging said roll of flexible material against the top of said cotton module; and then
d) pulling said bin and said roll of flexible material away from said first end of said cotton module to said second end of said cotton module, causing said flexible material to be paid out from said roll of flexible material over the top of said cotton module from said first end of said cotton module to said second end of said cotton module.

* * * * *